April 1, 1952  K. F. SPALDING  2,591,383
PLASTIC-SEALING ELEMENT
Filed March 11, 1950
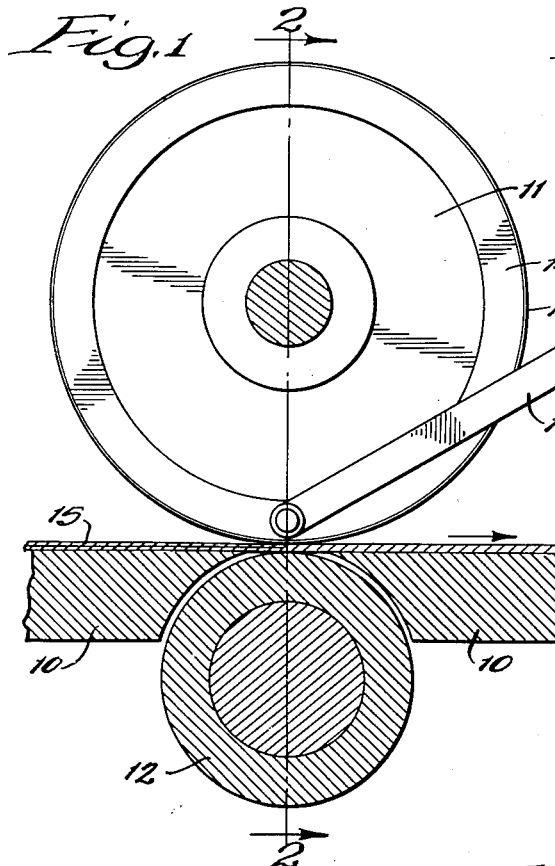
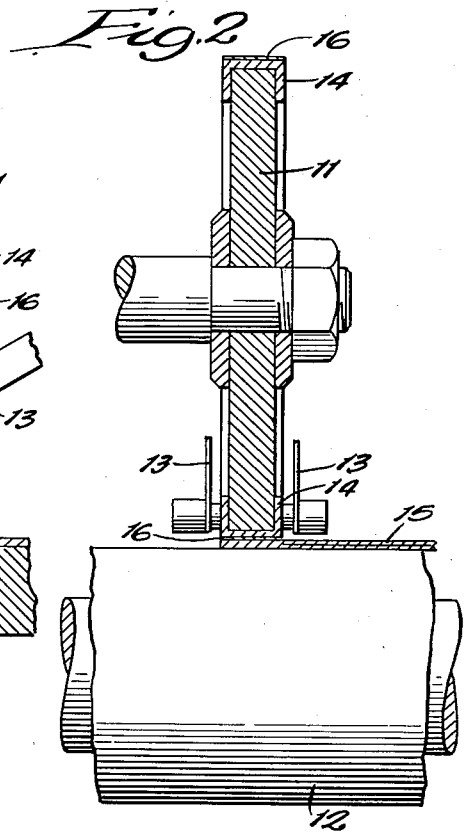
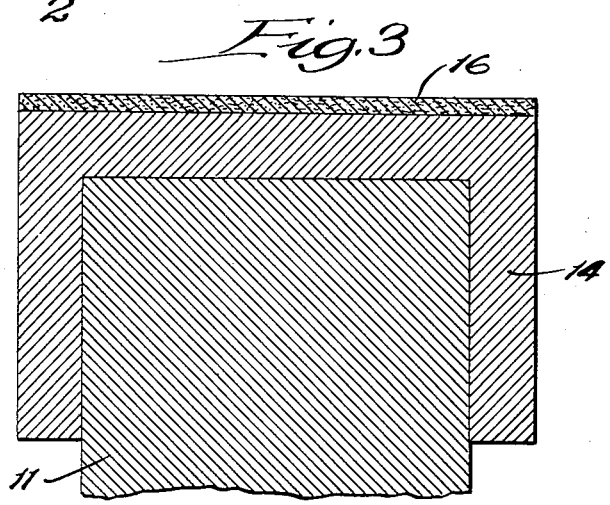
INVENTOR:
Kenneth F. Spalding,
BY Dawson, Ooms, Booth and Spangenberg,
ATTORNEYS.

UNITED STATES PATENT OFFICE 2,591,383

PLASTIC-SEALING ELEMENT

Kenneth F. Spalding, Lodi, N. J., assignor to William F. Stahl, Kenilworth, Ill.

Application March 11, 1950, Serial No. 149,158

5 Claims. (Cl. 154—42)

This invention relates to a new and improved buffer material for use on contact elements employed in heat-sealing of plastic.

The application of heat to plastic materials for raising them to fusion temperature and thereby joining into a single piece a plurality of lapped plastic sheets is a widely employed technique, and many improvements in the art of heat-sealing of plastics have been made during the past few years.

It has been found, for instance, that when a hot body, whether heated by steam, electricity, or other energy source, is employed as a means of imparting heat to plastic sheets, best results are obtained when a buffer material, formed of a heat-insulating substance, is interposed between the hot body and the plastic sheets being sealed together.

Some difference of opinion has existed as to the exact function of these buffer substances. There can be no doubt that their use has resulted in more consistently strong seals. Moreover, when buffers have been used, the hot-body temperatures have been found to be less critical. Presumably the valuable function performed by the buffer substances has been to feed the heat from the hot body into the plastic material gradually, so as to accomplish more nearly uniform heating throughout the thickness of the plastic and to reduce the rate at which the plastic temperature is caused to rise.

Buffer materials have firmly established their place in the plastic-sealing art, and are in practically universal use despite the fact that none of the prior-art buffer structures have been wholly satisfactory from the practical standpoint.

The most widely used buffer substance has been cloth; many different varieties of cloth have been tried, and certain of them have been found to be quite successful as buffer materials—particularly on simple sealing apparatus in which a heated sealing bar is intermittently brought down onto superposed plastic sheets to effect sealing along a line.

Even in such applications, the cloth has not been wholly satisfactory, however, since it has a tendency to burn, char, or scorch if the temperature of the hot body is allowed to rise beyond relatively narrow limits.

In more complicated structures involving the formation of a continuous seam seal on plastic sheets—usually accomplished by the use of a rotating sealing member—cloth buffers have been quite definitely unsatisfactory. Their tendency to char and scorch has of course been against them in this application, and in addition they have been found to have very short life when employed in continuous sealing apparatus. Replacement of the cloth buffer has been necessary at frequent intervals, with resulting machine stoppage and interruption of production.

With the objective of overcoming the disadvantages of cloth as buffer material, some experimenters have tried using, as a buffer, thin sheets of high-temperature plastic material. Such buffers have, in general, been found to be considerably more long-lived than cloth, but other practical disadvantages have prevented their general adoption in the sealing industry.

The most serious objection to plastic buffers, in all probability, is their tendency to stick to the plastic material being treated. Such an effect is, of course, highly objectionable, since it causes the seal to be destroyed and the upper plastic sheet mutilated when the sealing member is withdrawn from the hot plastic, either by being lifted or by rolling, as in the case of a continuous-seal apparatus. The plastic buffer is also open to criticism, however, on the additional ground that plastic buffers tend to wrinkle and crack under sustained use at high temperatures.

The object of this invention is to provide a novel and highly satisfactory buffer material or coating for sealing elements, either of the bar type or of the rotary wheel type.

In the prior art, buffers have in some cases been formed as endless belts arranged to pass continuously between the sealing element and the plastic being sealed. In other cases the buffer material has been affixed directly to the sealing element in the form of a cover therefor. For example, in the bar-sealing type of machine, the sealing bar has on occasion been insulated from the plastic being sealed by a layer of cloth secured to the face of the sealing bar; in other cases, a buffer strip formed of plastic has been cemented to the face of the sealing bar to insulate the hot bar itself from the plastic.

The present invention relates to a coating material which I have found can be easily applied to the working face of a sealing bar of any type and which is fully effective as a buffer and is at the same time free from the defects of prior-art buffer materials.

My coating, while it serves as a very effective insulating agent between the hot sealing bar and the plastic being sealed, will not stick to any plastic material on which I have tested it, and my experiments have extended over virtually all the plastic sheet materials currently employed in commercial practice. It is accordingly an object of my invention to provide a buffer coating for sealing elements which will function as an effective buffer and at the same time will not adhere to the plastic being sealed.

Similarly, by buffer coating does not crack or wrinkle at any temperature within the range of temperatures encountered in commercial sealing practice; it is accordingly another object of my invention to provide a buffer material which will adhere tenaciously to the face of a sealing bar or wheel and retain its smooth, unbroken surface through hard use at all temperatures encountered in commercial sealing techniques.

Still another object of my invention is to provide a long-lived and tenacious buffer material which, once applied to a sealing bar or wheel, will operate almost indefinitely without noticeable wear.

A still further object of my invention is to provide, in a buffer material for sealing elements, a liquid solution which can readily be applied to the surface of the sealing element to be treated and which, when allowed to set, hardens into a strong and long-lived, but non-brittle, coating which serves to insulate the hot sealing element from the plastic being sealed.

Other objects and advantages of my invention will appear as the specification proceeds.

The drawing in the present application shows, for the most part, a wheel-shaped sealing element for a continuous-seal apparatus, as disclosed in my copending application, Serial No. 67,694, filed December 28, 1948, now Patent No. 2,556,008, issued June 5, 1951. It is shown herein solely to illustrate the manner of application of my buffer coating material. The present invention is concerned entirely with the composition of the buffer coating.

Figure 1 of the drawing shows, partly in section, a fragmentary view of a continuous-seal plastic-sealing machine; Fig. 2 shows a sectional view of the apparatus of Fig. 1, the section being taken along the line 2—2 of Fig. 1; and Fig. 3 shows, in a greatly enlarged scale, a sectional view of a portion of the rim of the sealing wheel of Figs. 1 and 2, to bring out the manner of application of my buffer material.

My novel buffer material, which I have found to possess extraordinarily long life, absence of adhesion, and maintenance of surface texture under high temperatures, employs as its base a varnish capable of resisting high temperatures, such as silicone varnish. The varnish is substantially saturated with short fibers made of glass or some high-temperature plastic such as polytetrafluorethylene.

The temperatures normally encountered for sealing purposes in commercial sealing practice range from 200° to 400° F. Silicone varnish, I find, is entirely stable up to temperatures between 600° and 700° F. The varnish is given bulk and structural or skeletal strength by the fibers of glass or plastic with which the varnish is saturated.

The viscosity of silicone varnish as it is normally supplied is of the order of 50 to 60 cps. Finely ground glass or plastic fibers, having a thickness of .0005 inch or less and lengths of the order of .015 inch or less, are added to the varnish until the viscosity of the mixture is in the range between 500 and 1500 cps.

The surface of the sealing member which is placed in contact with the plastic is then coated with a layer of the resulting buffer material. It is unnecessary to coat any portion of the sealing apparatus other than the surface in actual contact with the plastic to be sealed.

The accompanying drawing, by way of example, shows a plastic-sealing apparatus comprising a base member 10, a rotary sealing wheel 11, a cooperating pressure wheel 12, and electrical contact members 13. As heretofore mentioned, the sealing apparatus shown is similar to that disclosed in my copending application, Serial No. 67,694, filed December 28, 1948, now Patent No. 2,556,008, issued June 5, 1951.

The periphery of the sealing wheel 11 is provided with a metallic tire or rim member 14, formed of an electrical resistance material such as Nichrome. Contacts or brushes 13 press on opposite sides of tire 14, as shown in Fig. 2, and the portion of tire 14 in contact with the plastic sheets 15 is heated to a sufficiently high temperature to effect fusion of the plastics.

The buffer which is characteristic of the present invention is a thin layer 16, formed over the contact surface of tire 14. As may be seen from Figs. 1 and 2, the metallic portion of tire 14 never is in direct contact with the plastic sheets 15; buffer layer 16 is always interposed between the two.

I have found that a sealing member of the type shown and described herein will operate indefinitely at all sealing temperatures encountered in commercial use without breaking of the surface texture of the coating 16, without sticking to the plastic sheets, and without appreciable wear.

Eventually, it is true, the coating 16 will be worn away, and when that occurs it can be replaced by a simple re-application of the liquid coating material herein described. After the new coating has set, and hardened, the sealing member is ready for another long period of use.

The thickness of the coating of material to be applied will vary according to the requirements of the plastic being sealed, and I do not limit myself herein to any particular thickness or range of thicknesses. I have found that in most cases a coating between .001 inch and .010 inch in thickness forms a successful buffer, protecting the plastic sheets from too-rapid heating while at the same time permitting a relatively fast sealing operation.

While I have in this specification described my invention with respect to a particular illustrative embodiment, it is understood that many changes therein and departures therefrom may be made by persons skilled in the art without departing from the spirit of my invention. Accordingly, I desire that the scope of my invention be determined primarily with reference to the appended claims.

I claim:

1. A plastic-sealing member comprising a wheel having a metallic rim adapted to be heated for effecting seals from plastic materials, said rim being coated to a thickness between .001 inch and .01 inch with a layer of buffer material formed of silicone varnish impregnated with spun glass fibers.

2. A plastic-sealing member comprising a wheel having a metallic rim adapted to be heated for effecting seals from plastic materials, said rim being coated to a thickness between .001 inch and .01 inch with a layer of buffer material formed of silicone varnish impregnated with polytetrafluorethylene.

3. A plastic-sealing member comprising a wheel having a metallic rim adapted to be heated for effecting seals from plastic materials, said rim being coated with a thin layer of silicone varnish impregnated with finely ground fibers of a high-temperature-resistant material.

4. A plastic-sealing member comprising a wheel having a metallic rim adapted to be heated for effecting seals from plastic materials, said rim being coated with a thin layer of silicone varnish impregnated with spun glass fibers.

5. A plastic-sealing member comprising a wheel having a metallic rim adapted to be heated for effecting seals from plastic materials, said rim being coated with a thin layer of silicone varnish impregnated with fibers of polytetrafluorethylene.

KENNETH F. SPALDING.

REFERENCES CITED

The following references are of record in the file of this patent:

UNITED STATES PATENTS

| Number | Name | Date |
| --- | --- | --- |
| 2,258,222 | Rochow | Oct. 7, 1941 |
| 2,424,558 | Delano | July 29, 1947 |
| 2,427,183 | Berry | Sept. 9, 1947 |
| 2,459,653 | Keyes | Jan. 18, 1949 |
| 2,470,593 | Webb | May 17, 1949 |
| 2,525,070 | Greenwald | Oct. 10, 1950 |